United States Patent
Wang et al.

(10) Patent No.: US 7,277,906 B2
(45) Date of Patent: Oct. 2, 2007

(54) METHOD FOR DETERMINING AN OUTPUT VALUE HAVING A LOWEST ERROR VALUE FROM AN INPUT VALUE

(75) Inventors: Hai-Wei Wang, Hsin-Chu (TW); Yi-Chih Huang, Taipei Hsien (TW)

(73) Assignee: Realtek Semiconductor Corp., HsinChu (TW)

( * ) Notice: Subject to any disclaimer, the term of this patent is extended or adjusted under 35 U.S.C. 154(b) by 782 days.

(21) Appl. No.: 10/707,701

(22) Filed: Jan. 5, 2004

(65) Prior Publication Data
US 2005/0149594 A1  Jul. 7, 2005

(51) Int. Cl.
*G06F 1/02* (2006.01)
(52) U.S. Cl. .................................... 708/270
(58) Field of Classification Search ........... 708/270
See application file for complete search history.

(56) References Cited

U.S. PATENT DOCUMENTS

| | | | | |
|---|---|---|---|---|
| 5,184,317 A * | 2/1993 | Pickett | ........................ | 708/446 |
| 5,359,551 A * | 10/1994 | Pickett | ........................ | 708/270 |
| 5,774,082 A * | 6/1998 | Chu et al. | .................... | 341/117 |
| 6,167,102 A * | 12/2000 | Hellberg | ....................... | 375/376 |
| 6,938,062 B1 * | 8/2005 | Matula et al. | .............. | 708/235 |

\* cited by examiner

*Primary Examiner*—D. H. Malzahn
(74) *Attorney, Agent, or Firm*—Winston Hsu

(57) ABSTRACT

The present invention teaches a method for generating an output value corresponding to an input value via a first function comprising a first section and a second section with the use of a lookup table, comprising: prestoring a plurality of first sampling points corresponding only to a third section of a second function, wherein the second function further includes a fourth section and there is a first mathematical transformation between the first function and the second function; receiving the input value corresponding to the first section; generating the output value based on at least one of the first sampling points through performing the first mathematical transformation on the first sampling point; and outputting the output value.

12 Claims, 6 Drawing Sheets

METHOD FOR DETERMINING AN OUTPUT VALUE HAVING A LOWEST ERROR VALUE FROM AN INPUT VALUE

BACKGROUND OF INVENTION

1. Field of the Invention

The invention relates to an apparatus for determining an output value according to a look up table and a method thereof, and more particularly, to an apparatus for determining an output value according to a simplified look up table and a method thereof.

2. Description of the Prior Art

Some specific mathematical functions, such as trigonometric function, exponential function, and logarithmic function, etc., are commonly-used in the operation of the electronic device, such as the electronic device for used in a communication system. It should be noted that the operation of such specific functions are complicated such that a complicated circuit is needed to perform such operations. One of the conventional methods is to build a look up table inside the electronic device to generate the expected value based on the sampling points stored in the look up table through interpolation, instead of performing the complicated math function directly. However, such specific mathematical functions are not linear functions. Therefore, a lot of sampling points needed to be stored in the look up table in order to meet the accuracy requirement of the electronic device. The memory size used for the look up table is large.

SUMMARY OF INVENTION

It is therefore an objective of the claimed invention to provide a method for selectively determining an output value from an input value to reduce memory usage.

According to the claimed object, a method for generating an output value corresponding to an input value via a first function comprising a first section and a second section with the use of a lookup table, comprising: prestoring a plurality of first sampling points corresponding only to a third section of a second function, wherein the second function further includes a fourth section and there is a first mathematical transformation between the first function and the second function; receiving the input value corresponding to the first section; generating the output value based on at least one of the first sampling points through performing the first mathematical transformation on the first sampling point; and outputting the output value.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
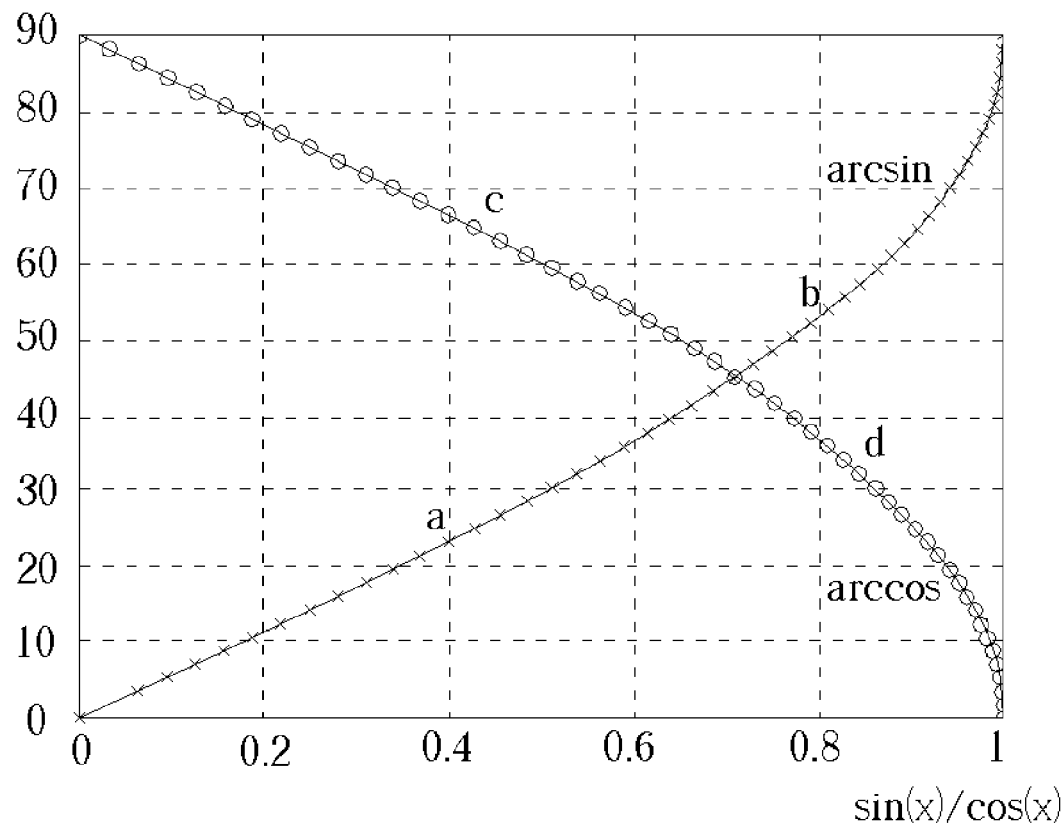
FIG. 1 is a schematic diagram of the curves of the arcsine and arccosine function.

Please refer to FIG. 1, it shows the diagram of the arcsine and the arccosine functions. In the embodiment of the present invention, the apparatus for determining the output value of the arcsine and/or the arccosine function and the method thereof are disclosed. The arcsine and the arccosine functions are not linear functions. The slope of the curves varied, as shown in FIG. 1.

There are two transformation formulas for converting the arcsine function to the arccosine function and vise versa, which are arcsin(x)+arccos(x)=90°, wherein the absolute value of $x \leq 1$, and sin(x)=cos(90°−x). In the embodiment of the present invention, the curve of arcsine function is divided into two sections, which are 0<arcsine(x)<45° (section a) and 45°<arcsine(x)<90° (section b) and the curve of arccosine function is divided into two sections, which are 0<arccosine(x)<45° (section c) and 45°<arccosine(x)<90° (section d). Only one of the four sections is needed to store in the look up table. The other three sections can be generated based on the stored section through the transformation formulas disclosed above. In this manner, the memory size reserved for the look up table can be reduced.

Take arcsine curve as an example, the slope of section a curve is smaller than the slope of the section b curve. Therefore, if section a curve is stored in the loop up table though storing a number of sampling points and the other three sections are generated based on the sampling points of the section a curve. The accuracy of the result through interpolation can be much higher than generating the other sections based on the sampling points of the section b curve. Thus, in this embodiment of the present invention, it is preferably to store either section a curve or section c curve to the loop up table.

In other words, if section a is the curve stored in the loop up table, it takes lesser bits for each of the sampling points stored in the look up table to fit in with the accuracy requirement compared with that section b curve is stored in the loop up table. Thus, the memory size reserved for the loop up table can be further reduced.

Figure 2:
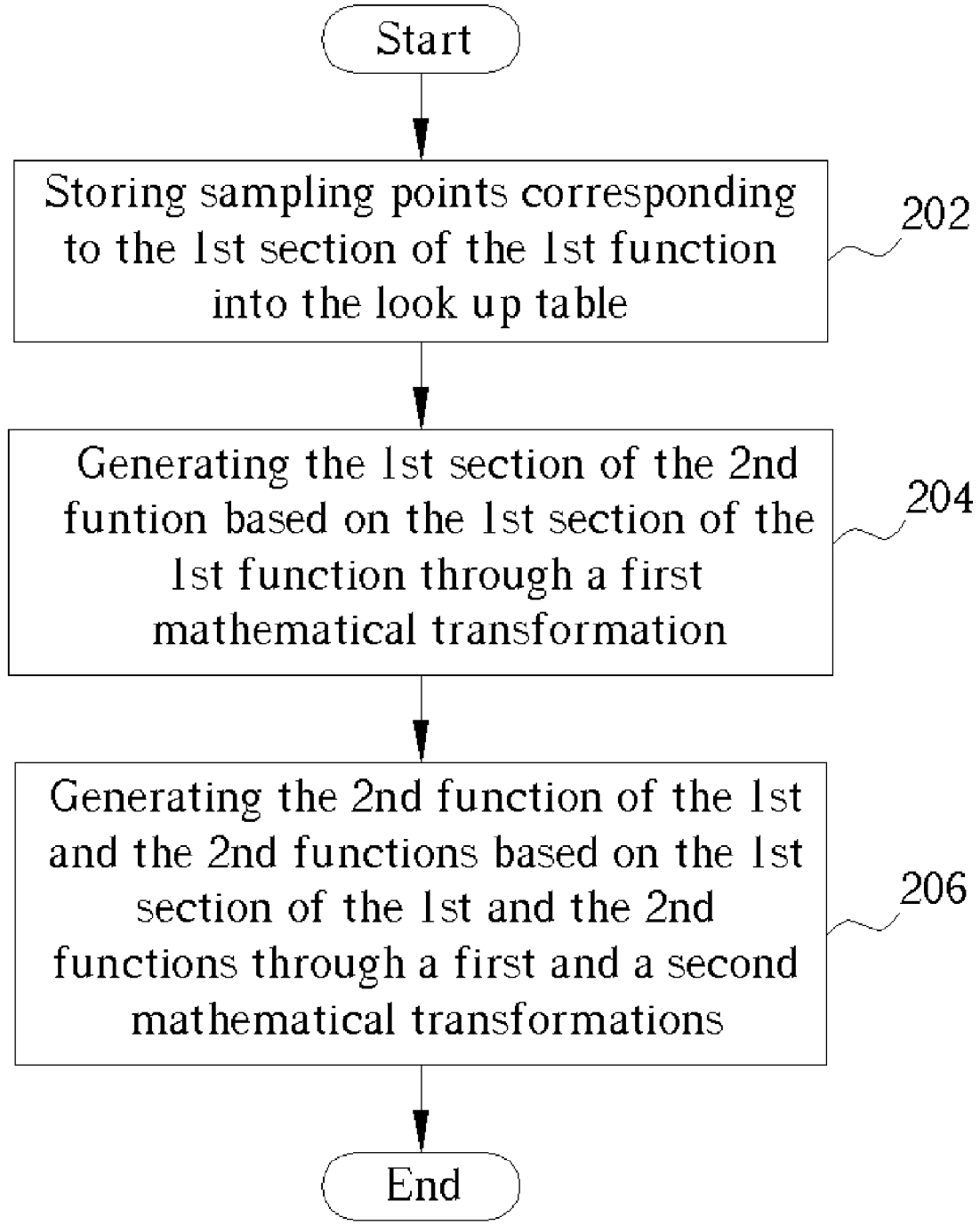
FIG. 2 is the flow chart according to the first embodiment of the present invention.

FIG. 2 shows the flow chart based on the first embodiment of the present invention, which follows:

Step 202: Storing sampling points corresponding to only the first section (Ex: section a of FIG. 1) of the first function (Ex: arcsine function) into the look up table after determining that there is at least a mathematical transformation between the first function and the second function (Ex: arccosine function).

Step 204: Generating the first section (Ex: section c of FIG. 1) of the second function based on the first section of the first function through the first mathematical transformation (Ex: arcsin(x)+arccos(x)=90°, wherein the absolute value of $x \leq 1$).

Step 206: Generating the second section of the first function and the second function (Ex: section b of arcsine function, section d of arccosine function shown in FIG. 1) based on the first section of the first function and the second function through the first mathematical transformation and the second mathematical transformation (Ex: sin(x)=cos (90°−x)) It should be noted that the section d of the arccosine function can be generated first then section b of the arcsine function and the section c of the arccosine function can be generated later. The steps of generating section b, c, and d respectively based on section a can be performed in any logical order.

Figure 3:
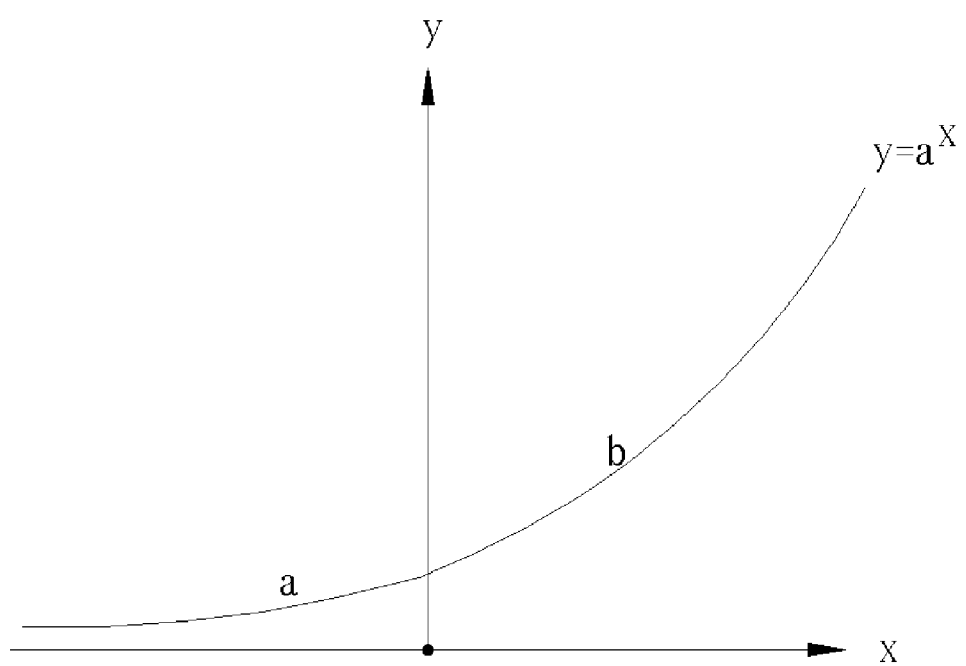
FIG. 3 is a schematic diagram of the curve of the exponential function.

Please refer to FIG. 3, it shows the diagram of the exponential function: $y=a^x$. The exponential functions is not linear functions. The slope of the curves varied, as shown in FIG. 3.

The exponential function of FIG. 3 can be divided into section a, if $x<0$, and section b, if $x \geqq 0$. There is a transformation formula to show the mathematical relationship between section a and section b that $a^x=1/a^{-x}$. Therefore, only one of the two sections is needed to store in the look up table. The other section can be generated based on the stored section through the transformation formula disclosed above. In this manner, the memory size reserved for the look up table can be reduced.

In addition, the slope of section a curve is smaller than the slope of the section b curve. Therefore, in this embodiment of the present invention, it is preferably to store section a curve to the loop up table. In this manner, it takes lesser bits for each of the sampling points stored in the look up table to fit in with the accuracy requirement compared with that section b curve is stored in the loop up table. Thus, the memory size reserved for the loop up table can be further reduced.

Figure 4:
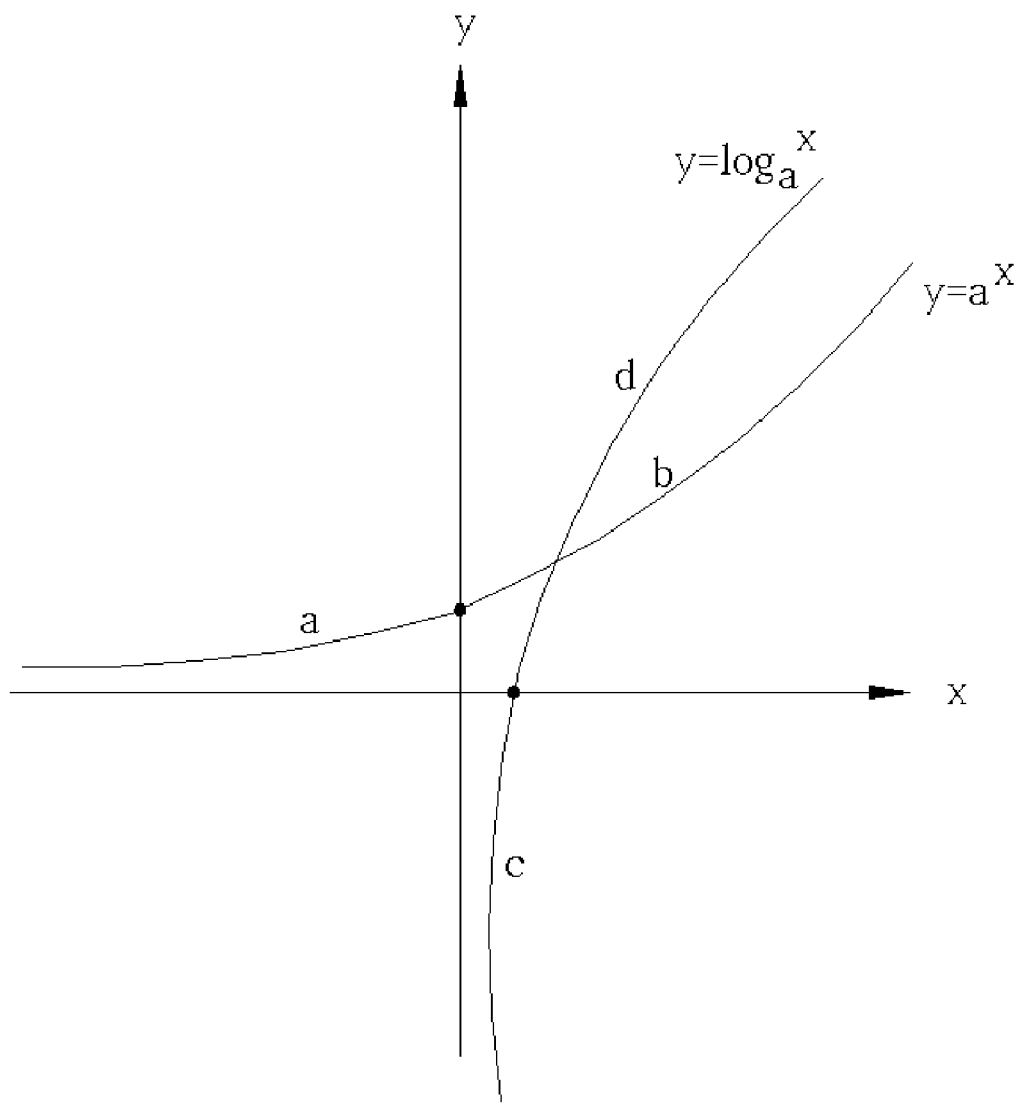
FIG. 4 is a schematic diagram of the curves of the exponential and the logarithmic function.

FIG. 4 shows the diagram of the exponential function: $y=a^x$ and the logarithmic function: $y=\log_a x$. Since the exponential function is the inverse function of the logarithmic function and vice versa, the curve of the logarithmic function: $y=\log_a x$ can be generated based on the exponential function: $y=a^x$. Accordingly, if section a curve of FIG. 4 is stored in the loop up table though storing a number of sampling points, the other three sections of FIG. 4 can be generated based on the sampling points of the section a curve.

Figure 5:
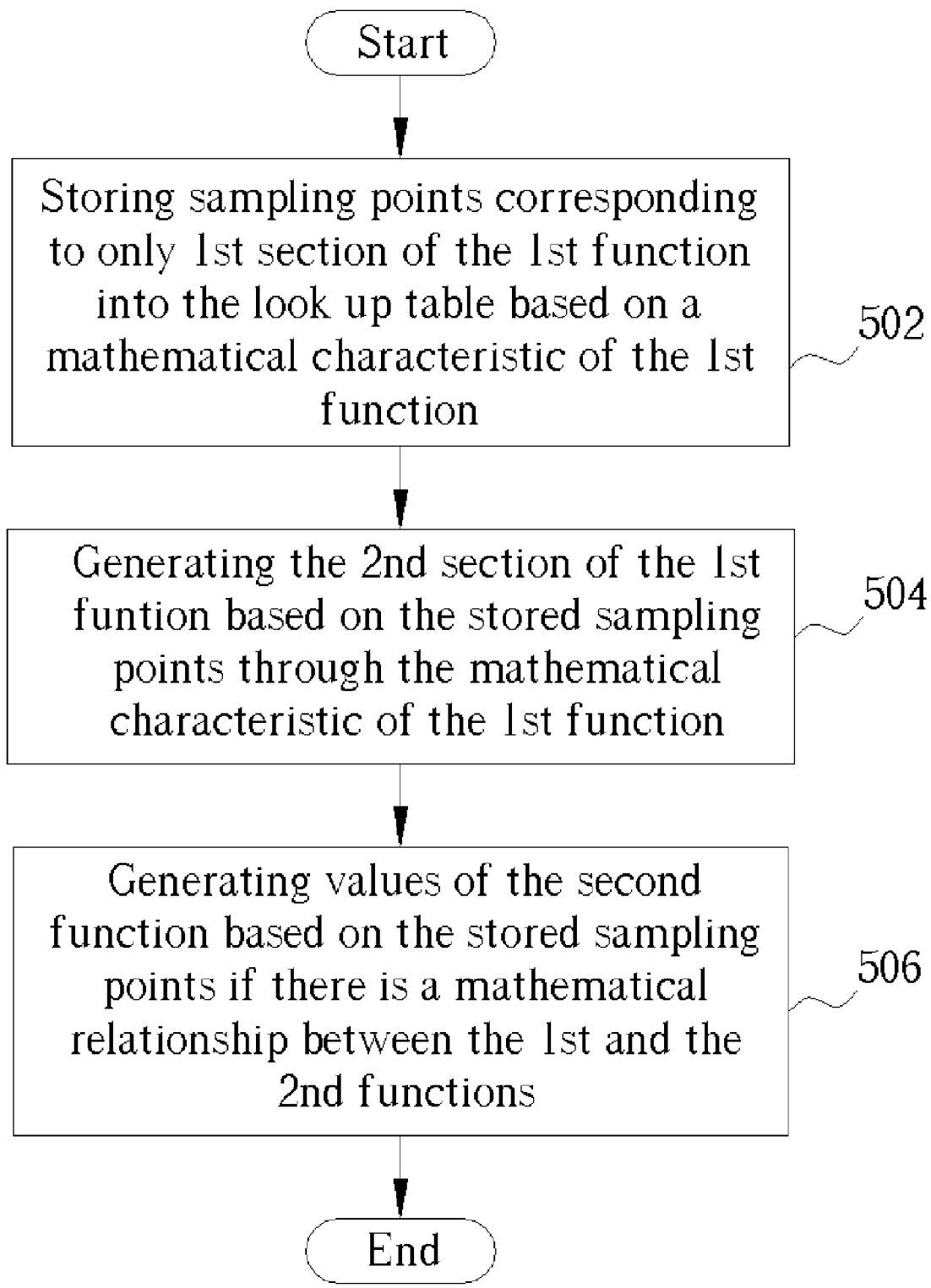
FIG. 5 is the flow chart according to the second embodiment of the present invention.

FIG. 5 shows the flow chart based on the second embodiment of the present invention, which follows:

Step 502: Storing sampling points corresponding to only the first section (Ex: section a of FIG. 4) of the first function (Ex: exponential function) into the look up table after determining that there is at least a mathematical transformation between the first function and the second function (Ex: logarithmic function).

Step 204: Generating the second section (Ex: section b of FIG. 4) of the first function based on the first section of the first function through the first mathematical transformation (Ex: $a^x=1/a^{-x}$).

Step 206: Generating the values of the second function based on the first section of the first function if there is a mathematical relationship between the first and the second function (inverse function in between).

It should be noted that the steps of generating section b, c, and d respectively based on section a can be performed in any logical order.

Figure 6:
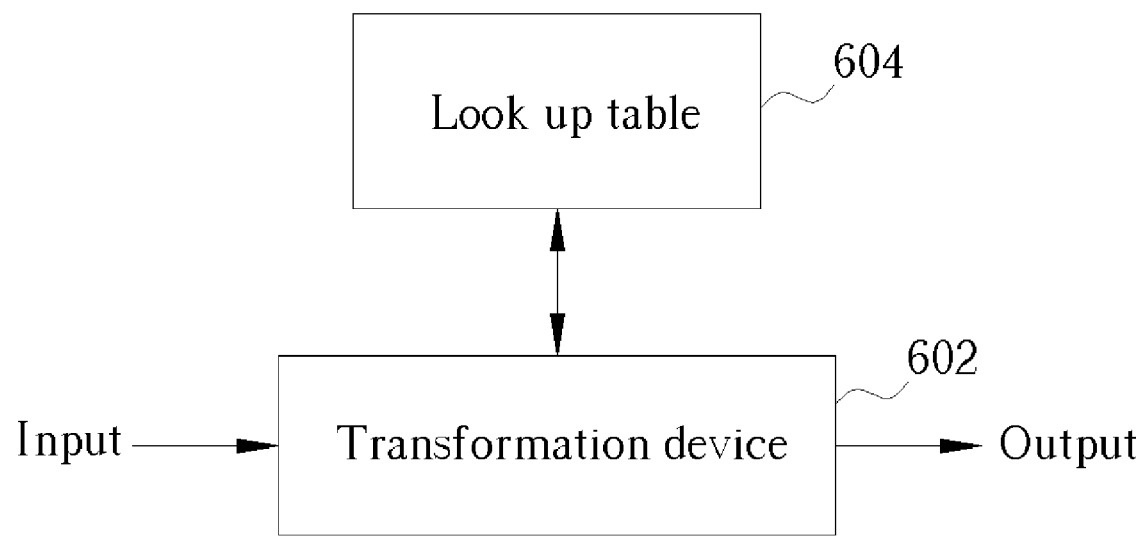
FIG. 6 is the apparatus according to the embodiment of the present invention.

Please refer to FIG. 6, it shows the apparatus for performing the above described methods according to the embodiments of the present invention. The apparatus includes a lookup table 604 and a transformation device 602. When the apparatus receives an input value, the transformation device 602 may perform the above-described methods based on the sampling points stored in the look up table 604 to generate the corresponding output. The look up table device 604 comprises a lookup table for storing at least a first portion of a first function. The transformation device 602 for deriving the output value corresponding to an input value according to the first portion of the first function, wherein a relationship between the input value and the output value is determined by at least a portion of a second function which can be transformed from the first portion of the first function through a first mathematical transformation, and a second portion of the first function relationship which can be transformed from the first portion of the first function through a second mathematical transformation. The transformation device 602 can be any analog or digital circuitry that can perform mathematical operations such as a central processing unit, a data processing unit, a DSP, and a scientific calculator but not limited to what is disclosed.

According to the embodiment disclosed above, the present invention can selectively determining an output value from an input value so that the required number of bits in greatly reduced and the resolution of the input does not have to be limited to match the output resolution. As a result, the physical size of the circuit is reduced and at the same time the cost of the circuit is lowered.

Those skilled in the art will readily observe that numerous modifications and alterations of the device may be made while retaining the teachings of the invention. Accordingly, that above disclosure should be construed as limited only by the metes and bounds of the appended claims.

The invention claimed is:

1. A method for building a lookup table of a first curve representing a first function and a second curve representing a second function, wherein there is a mathematical transformation between the first function and the second function, the method comprising:

comparing a slope of the first curve with a slope of the second curve; and storing either the first curve or the second curve based on a result of the comparison, wherein storing the first curve if the slope of the first curve is smaller than the slope of the second curve, and storing the second curve if the slope of the first curve is larger than the slope of the second curve.

2. The method for generating an output corresponding to an input value via a first function with the use of a lookup table, wherein the lookup table only includes a plurality of first sampling points corresponding to a second function and there is a mathematical transformation between the first function and the second function, comprising:

receiving the input value;

generating the output value based on at least one of the first sampling points through performing the mathematical transformation on the first sampling point; and outputting the output value.

3. The method of claim 2, wherein the first function is a sine function and the second function is a cosine function.

4. The method of claim 2, wherein the first function is an arcsine function and the second function is an arccosine function.

5. The method of claim 2, wherein the first function is an exponential function and the second function is a logarithmic function.

6. The method of claim 2, wherein the second function further includes a first section and a second section and the first sampling points are only corresponding to the first section of the second function.

7. The method of claim 6, wherein there is a second mathematical transformation between the first section and the second section of the second function and a plurality of second sampling points corresponding to the second section of the second function can be generated through performing the second mathematical transformation on the first sampling points.

8. A method for generating an output value corresponding to an input value via a first function comprising a first section and a second section with the use of a lookup table, comprising:

prestoring a plurality of first sampling points corresponding only to a third section of a second function, wherein the second function further includes a fourth section and there is a first mathematical transformation between the first function and the second function;

receiving the input value corresponding to the first section;

generating the output value based on at least one of the first sampling points through performing the first mathematical transformation on the first sampling point; and outputting the output value.

9. The method of claim 8, wherein there is a second mathematical transformation between the third section and the fourth section and the output value generating step further comprises:

generating at least one of a second sampling point corresponding to the fourth section through performing the second mathematical transformation on at least one of the first sampling points; and generating the output value based on the second sampling point through performing the first mathematical transformation on the second sampling point.

10. The method of claim 8, wherein there is a third mathematical transformation between the first section and the second section and the output value generating step further comprises:

generating at least one of a third sampling point corresponding to the first section through performing the first mathematical transformation on at least one of the first sampling points; and generating the output value based on the third sampling point through performing the third mathematical transformation on the third sampling point.

11. The method of claim 8, wherein there is a fourth mathematical transformation between the third section and the forth section and there is a fifth mathematical transformation between the first section and the second section, the output value generating step further comprises:

generating at least one of a fourth sampling point corresponding to the fourth section through performing the fourth mathematical transformation on at least one of the first sampling points;

generating at least one of a fifth sampling point corresponding to the first section through performing the first mathematical transformation on at least one of the fourth sampling points; and generating the output value based on the fifth sampling point through performing the fifth mathematical transformation on the fifth sampling point.

12. An apparatus for determining an output value corresponding to an input value via a first function comprising a first section and a second section, comprising:

a lookup table for prestoring a plurality of first sampling points corresponding only to a third section of a second function, wherein the second function further includes a fourth section and there is a first mathematical transformation between the first function and the second function; and a transformation device for generating the output value corresponding to the input value based on at least one of the first sampling points through performing the first mathematical transformation on the first sampling point.

* * * * *